April 17, 1956 M. DRODOFSKY 2,741,940
TELESCOPE
Filed Feb. 20, 1953
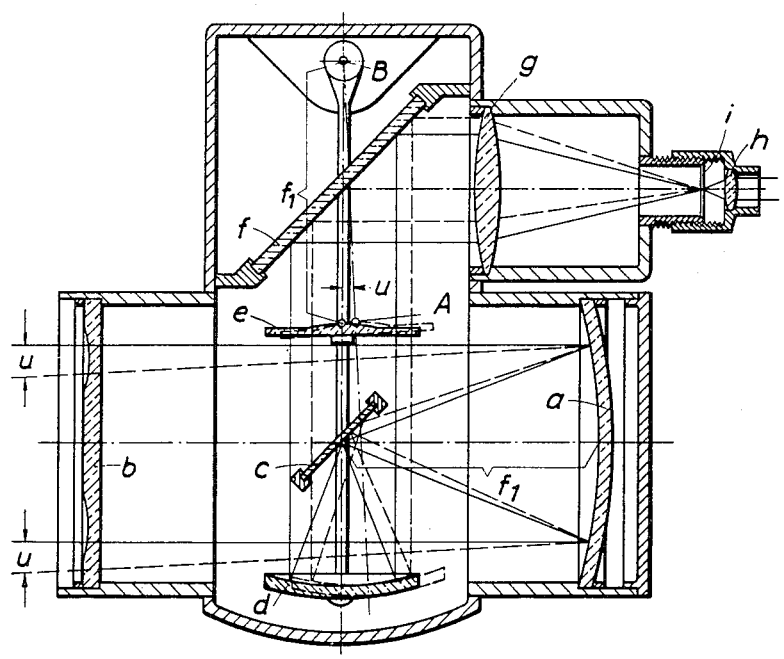

United States Patent Office 2,741,940
Patented Apr. 17, 1956

2,741,940

TELESCOPE

Martin Drodofsky, Heidenheim (Brenz), Wurttemberg, Germany, assignor to Carl Zeiss, Heidenheim (Brenz), Germany Application February 20, 1953, Serial No. 337,910

4 Claims. (Cl. 88—2.4)

In leveling instruments and similar instruments leveling of the line of sight in most cases is carried out with the aid of level vials. Working with level vials however, as is known, includes a series of disadvantages; especially the expenditure of time required therewith for adjusting the bubble is very burdensome. Therefore one has already outlined arrangements in which the line of sight independently of smaller movements of the telescope retains a constant angle with the vertical by making use of a pendulum device. The invention offers a new and comparatively simple way for solving this problem, namely by the following structure. The rays, from an image of the object produced by a collective system, are received by means of a telescope equipped with a sight graticule after having been reflected from a small accessory mirror firmly connected with the collective system, and located about in its focal plane and from a spherical concave mirror pendulously mounted round a point lying on the optical axis of the collective system mirrored by the small accessory mirror and spaced from the accessory mirror by half the amount of its radius of curvature, while the distance of its radius of curvature from the said point is equal to the focal length of the collective system. The real image of the object, produced in this arrangement by the collective system on the small accessory mirror, travels away with small movements of the apparatus in the height direction on the accessory mirror somewhat towards above or below and therewith also the beam falling on the pendulously mounted concave mirror. Since now the concave mirror in a movement of the apparatus swings out about its suspension point and thereby the center of curvature of the concave mirror has a distance from the suspension point equal to the focal length of the collective system, then the beam conducted on by the concave mirror retains unchanged its direction; it is solely displaced parallel to itself by the small amount of the deflection. The same holds therewith also for the beam entering the actual telescope, so that the line of sight remains unchanged in spite of the oscillations of the apparatus. The collective system, which receives the rays coming from the object, can be formed as well from a system of lenses, as also from a system of mirrors, for example a paraboloid mirror or a Schmidt mirror system. It is evident, that the striven for effect only sets in if the swinging concave mirror forms a spherical surface, since only this has the property, to always reflect an incident light beam in the same manner in a movement of the mirror about the center of curvature independently of the existing position. To remove the image defects of this concave mirror, it is advisable to combine it with a Schmidt correction plate, whereby as is known it is expedient to mount the Schmidt plate in the vicinity of the center of curvature of the concave mirror.

In the drawing an example of the invention is represented by a diagrammatic longitudinal section, in which the direction of looking into the instrument lies parallel to the direction of looking out and a Schmidt mirror system is used as collective system. The collective system is embodied in a spherical concave mirror $a$ and operating in conjunction with it a Schmidt correction plate $b$. At the focal point of this system firmly connected therewith is a small plane mirror $c$, lying at 45° to the axis, which conducts the incident rays downwards to a spherical concave mirror $d$. This directs the rays as a parallel beam through a Schmidt correction plate $e$, across a mirror $f$, into the actual observation telescope, which is formed by an objective $g$, an ocular $h$ and a graticule $i$. The Schmidt plate $e$ lies close to the center of curvature designated by A of the concave mirror $d$ and is firmly connected with the latter. The system $d, e$ is developed as a pendulum, which can swing about a point B above the system $d, e$ and for which the distance of the point A from the focal point B is equal to the focal length of the mirror $a$. The system $a, b, c$, the mirror $f$ and the telescope $g, h, i$ are to be thought of as firmly connected with one another. If the apparatus executes small movements in the height direction, then the image of the object produced by $a, b$, travels away on the small mirror $c$ somewhat towards above or below. At the same time however the pendulum $d, e$ likewise swings to the side about the point B, i. e. the optical axis of the pendulum mirror system, $d, e$ travels somewhat sidewise parallel to itself. Since however a parallel path of rays obtains between the concave mirror $d$ and the objective $g$, the line of sight retains its direction unchanged.

I claim:

1. A telescope viewing device including in a common housing an observing telescope having an objective an eyepiece and a sighting mark located in the back focal plane of said objective, and means for stabilizing the line of sight of said device with regard to small inclinations of said telescope from the horizontal, said means being located in the optical path of rays in front of said observing telescope and comprising means for converging an original beam of parallel light, a spherical concave mirror, and between them and firmly connected with said converging means a small plane mirror located in about the focal planes of both said converging means and said spherical concave mirror and inclined at 45° to the direction of the optical axis of said converging means for receiving the rays from said converging means and deflecting them to said spherical concave mirror, a pivot arranged on said housing with its axis perpendicular to the direction of the optical axis of said spherical concave mirror, said spherical concave mirror being pendulously suspended on said pivot, said pivot having a distance from the centre of curvature of said spherical concave mirror, being equal to the focal length of said converging means, and means located between spherical concave mirror and said telescope for reflecting the deflected rays to said telescope.

2. A telescope viewing device according to claim 1, said converging means consisting of a Schmidt mirror system comprising a spherical concave mirror and a Schmidt correction plate, said plane mirror to deflect the rays to the pendulously suspended spherical concave mirror being located between the spherical concave mirror of the Schmidt mirror system and the correction plate of this system in the focal plane of said mirror.

3. A telescope viewing system according to claim 1, a Schmidt correction plate combined with said pendulously suspended concave mirror, said plane mirror to deflect the rays to the pendulously suspended spherical concave mirror being located between the said concave mirror and said Schmidt plate in the focal plane of said mirror.

4. A telescope viewing system according to claim 1 wherein the optical axis of said converging means and said telescope system are parallel to each other, and the means located between said spherical concave mirror and said telescope for reflecting the deflected rays to said telescope is a plane mirror inclined at an angle of about 45° to the direction of the optical axes of said telescope.

References Cited in the file of this patent

UNITED STATES PATENTS

| | | |
|---|---|---|
| 2,313,204 | Morelle | Mar. 9, 1943 |
| 2,395,921 | Thurlow | Mar. 5, 1946 |